March 5, 1957     H. ROMANOFF     2,783,893
AQUARIUM DRAIN ATTACHMENT
Filed Oct. 12, 1953

INVENTOR.
HAROLD ROMANOFF.
BY
*Percy Freeman*
ATTORNEY.

United States Patent Office 2,783,893
Patented Mar. 5, 1957

2,783,893
AQUARIUM DRAIN ATTACHMENT
Harold Romanoff, Brooklyn, N. Y.

Application October 12, 1953, Serial No. 385,377

3 Claims. (Cl. 210—94)

This invention relates generally to aquariums, and is particularly directed to a drain attachment for use in aquariums of the type wherein small fish are reared and displayed.

The particular embodiment of the present invention, which is illustrated in the drawings and which will be described hereinafter in greater detail, comprises generally a plate-like member adapted to be positioned in spaced relation with respect to the aquarium outlet, and projections on the plate-like member which are insertable into the aquarium outlet for retaining the member in proper position to permit the removal of water and foreign matter while preventing the removal of the fish.

As is well known to those versed in the art, it is usually necessary to re-circulate the water in an aquarium tank in order to maintain correct balance with respect to temperature, purity, etc., and to avoid damage to fish and plants as well as for reasons of economy and to avoid the periodic labor of changing the water with the attendant messy conditions. Aquarium tanks are conventionally provided with a filtering system in which the water, including waste and other foreign matter, is removed from the tank, passed through a filter, and delivered to the tank in filtered condition. However, in the case of aquariums used for relatively small fish, difficulty has been experienced with strainers of conventional construction, which are merely perforated tubular sections attached to the outlet end of the tube to the filter. If the openings are sufficiently small to stop the fish, they quickly become clogged with dirt and other undesirable solid matter so as to require frequent removal and cleaning to avoid contamination of the water and fish. On the other hand, if the perforations are sufficiently large to pass the waste and other solid matter, it will be impossible to keep the small fish out of the outlet opening.

Accordingly, it is a principal object of the present invention to provide an aquarium outlet drain pipe attachment which will permit the passage therethrough of relatively large solid waste particles while stopping the passage of fish and the like. An allied object of the present invention is to provide a drain pipe attachment of the type described which requires only infrequent cleanings, and which can be quickly and easily removed for cleaning or replacement.

Because the circulation in the tank produces currents, there is a tendency of the water and foreign matter in the tank to move from the inlet pipe toward the outlet pipe and down along said outlet pipe to the outlet openings. Obviously when the foreign matter is moving downwardly along the outlet pipe, it will tend to be sucked into the outlet through the perforations or openings.

It is another object of the present invention to provide a drain pipe attachment having the characteristics mentioned in the foregoing paragraphs which includes novel means for attracting collecting and retaining solid particles to subject them to the suction to be removed through the openings provided.

It is a further object of the present invention to provide an aquarium drain pipe attachment of the type described which is simple in construction and durable in operation, which is effective for its intended purposes, and which can be manufactured and sold at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figure 1:
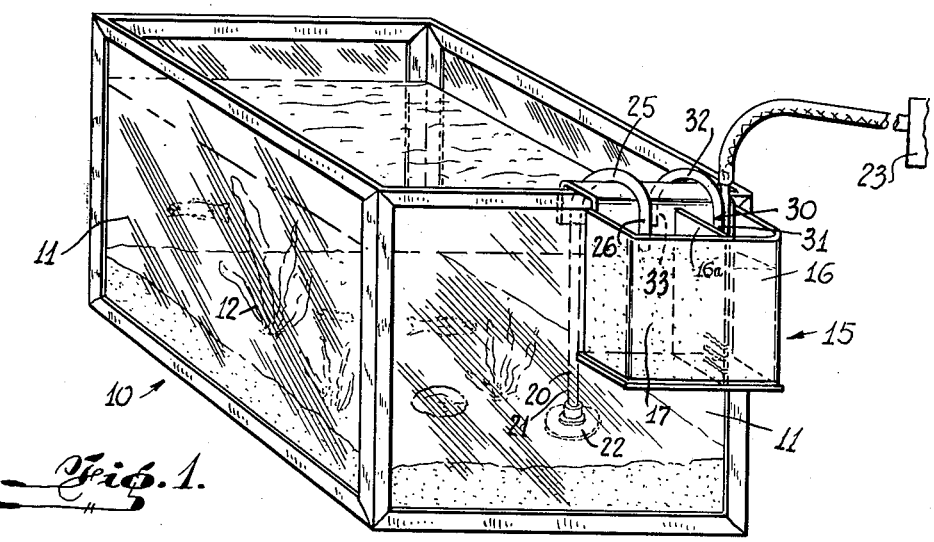
Fig. 1 is a perspective view showing an aquarium employing the device of the present invention.

Referring now more particulary to the drawings, the embodiment of the invention illustrated therein comprises an aquarium tank, generally designated 10 having upstanding side walls 11 and usually provided internally with plant life, as at 12.

A filtering system, generally designated 15, includes a receptacle 16 exteriorly of the tank 10 adjacent to the upper edge of one wall 11, and contains a filter bed 17 of any suitable filtering material.

An outlet drain pipe 20 depends vertically into the tank 10 having one end 21 adjacent to and spaced above the bottom of the tank and provided with a drain attachment 22. The drain pipe is provided with a U-shaped upper portion 25 curving over the upper edge of the tank wall 11 and into the filtering bed section of receptacle 16 for discharging liquid material into the filter bed 17.

After the water has been filtered or purified by passage through the filtering bed 17, it passes to the other side of partition 16a from whence it will be returned to the tank 10 by the inlet pipe 30. The inlet pipe 30 is generally U-shaped having one leg 31 depending into the filtering receptacle 16, its bight portion 32 curving over the upper edges of the filtering receptacle and tank wall, and its other leg 33 depending into the aquarium tank. In conventional practice, the inlet pipe 30 is connected to a pump 23 of any suitable construction for forcing the filtered water from receptacle 16 to the aquarium tank 10.

Figures 2, 3:
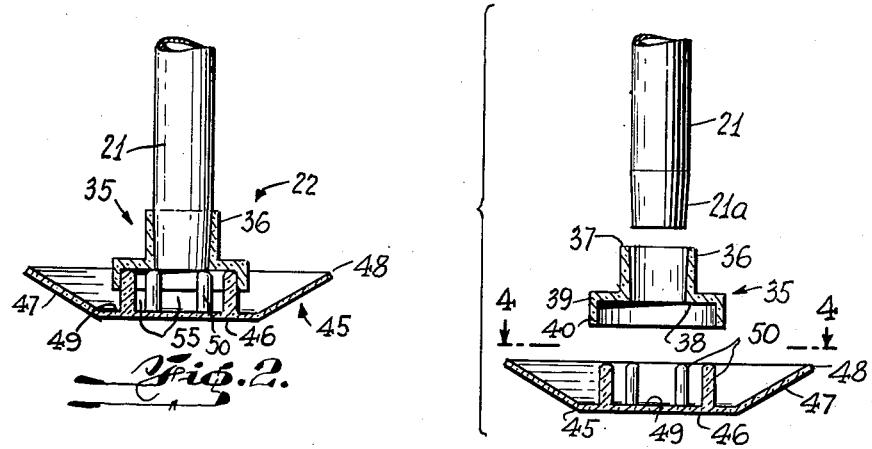
Fig. 2 is an enlarged, sectional elevational view showing the drain attachment of the present invention.
Fig. 3 is an exploded view showing the elements of the drain attachment of the present invention.
Figure 4:
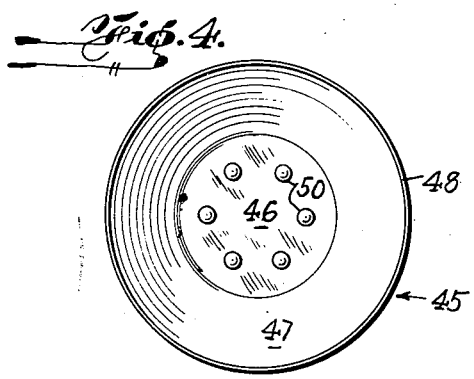
Fig. 4 is a view taken substantially along the line 4—4 of Fig. 3.

The construction of the drain attachment 22 is illustrated in greater detail in Figs. 2, 3 and 4. In Figs. 2 and 3, it is clearly seen that the drain attachment comprises a nipple or coupling 35 having a hollow tubular portion 36 tapering internally from one end surface 37 to the other end surface 38. The tubular portion 36 increases in diameter as at 39 adjacent to the end surface 38, the enlarged portion being provided with a longitudinally extending peripheral flange 40. Thus, it is seen that the peripheral flange 40 provides an enlarged tubular portion, and the surface 38 combines with the flange 40 to define an internal annular shoulder.

As seen in Fig. 2, the lower end 21 of the outlet drain pipe may be inserted into the nipple 35 through the end 37 and is tightly retained therein by frictional contact with the tapering internal surface of the tubular portion 36. Of course, the nipple 35 may be integrally, or otherwise secured to the drain pipe 20, for example, by welding or the like. In this manner, the nipple 35 provides an extension on the drain pipe 20 and the flange 40 serves as the outlet opening.

Arranged in facing spaced relation with respect to the flange 40 of the nipple 35 is a substantially circular, saucer-like member 45. The member 45 has a flat, circular central portion 46 and is provided with an upwardly and outwardly extending marginal border 47 having a bounding edge or rim 48. Thus, the saucer-like member 45 is dished in configuration. On the upper surface 49 of the central plate portion 46 are provided a plurality of circumferentially spaced projections or pins 50. It will be noted in Fig. 4, that the pins 50 are arranged in a circular configuration; and, as seen in Fig. 2, are insertable simultaneously into the nipple 35.

Thus, the saucer-like member 45 may be arranged in facing spaced relation with respect to the nipple 35, and the pins 50 insertable into the nipple with their free ends in abutting engagement with the internal nipple shoulder 38. As the pins 50 engage the internal surface of the nipple flange 40, the member 45 will be frictionally retained in position with respect to the nipple 35. Of course, it will be readily understood that the pins 50 of the member 45 may be inserted directly into the pipe 20 to provide effective operation without the nipple 35 if the end of pipe 20 is shaped to accommodate said pins.

In practice, the pins are spaced apart a predetermined distance, and so proportioned that the spaces 55 intermediate the end edge of the flange 40, the internal surface 49 of the plate portion 46, and adjacent pairs of the pins 50 are sufficiently small to prevent the passage therethrough of the particular type of fish being reared. Further, it will be noted upon inspection of Fig. 2, that the upwardly and outwardly diverging marginal plate portion 47 serves to somewhat obstruct the passageways between the pins 50 and make the latter less accessible to the fish.

As the saucer-shaped member 45 is substantially horizontal and upwardly facing, and positioned adjacent to the bottom of the tank 10, it will be apparent that solid particles will be collected in the saucer-shaped member for removal upwardly through the outlet drain pipe 20 by the suction created by the circulating system. That is, as the currents passing out through the drain pipe 20 must necessarily go downwardly to pass between the pins 50, it will be seen that the plate-like member 45 will serve to prevent falling of the solid particles to the bottom of the tank from whence the particles cannot be drawn upwards by the suction. The disc 45 collects the downwardly moving foreign matter and retains it in proximity to the outlet openings to be sucked out of the tank and expelled into the filter.

If an excess of solid particles accumulate on the saucer-like member 45, it is a simple matter to clean the latter by merely withdrawing the pins 50 from the flange 40 and removing the saucer-like member.

While the nipple 35 and saucer-shaped member 45 are both well adapted for mass production techniques by molding of plastic material, it is appreciated that these elements may be fabricated of any suitable material and manufactured in any desired manner.

From the foregoing, it is seen that the present invention provides a drain attachment for aquariums which fully accomplishes its intended objects, and which is well adapted to meet practical conditions of use.

Although the present invention has been described in some detail by way of illustration and example for purposes of clarity of understanding, it is understood that certain changes and modifications may be made within the spirit of the invention and the scope of the appended claims.

Having thus described my invention, what I claim as new and desire to secure by Letters Patent, is:

1. A drain attachment for an aquarium outlet opening, said attachment comprising a nipple in communication with said outlet opening, said nipple including an annular shoulder and a peripheral flange on said shoulder, a saucer-shaped member adapted to be arranged in facing spaced relation with respect to said nipple, and a plurality of circumferentially spaced projections on said member, said projections being insertable into said nipple in abutment with said shoulder and in frictional engagement with said flange, said member being retained in spaced relation with respect to said nipple solely by said friction, whereby water and dirt will pass between said projections and through said outlet opening while fish will be prevented from passing through said opening.

2. A drain attachment according to claim 1, said saucer-shaped member being dished so as to spacedly surround said outlet opening.

3. A drain attachment for an aquarium having a depending outlet drain pipe, said attachment comprising a nipple adapted to be circumposed about the end of said drain pipe, said nipple including an annular shoulder and a peripheral flange on said shoulder, a dished member adapted to be arranged in facing spaced relation with respect to said nipple, and a plurality of circumferentially spaced projections on said member, said projections being insertable into said nipple in abutment with said shoulder and in frictional engagement with said flange, said member being retained solely by said friction in spaced relation with respect to said nipple, with the edge of said member extending beyond and encircling said nipple.

References Cited in the file of this patent

UNITED STATES PATENTS

| | | |
|---|---|---|
| 1,452,259 | Snell | Apr. 17, 1923 |
| 1,490,186 | Rowe | Apr. 15, 1924 |
| 1,721,472 | Rose | July 16, 1929 |
| 1,945,824 | Saxe | Feb. 6, 1934 |
| 2,293,051 | Duffy | Aug. 18, 1942 |
| 2,300,952 | May | Nov. 3, 1942 |
| 2,518,205 | Vinokor | Aug. 8, 1950 |
| 2,665,250 | Willinger et al. | Jan. 5, 1954 |
| 2,687,216 | Shelton | Aug. 24, 1954 |